Patented July 1, 1930

1,768,869

UNITED STATES PATENT OFFICE

ALFRED UHLMANN, OF BERLIN-STEGLITZ, GERMANY, ASSIGNOR TO ALBERT T. OTTO & SONS, OF NEW YORK, N. Y., A CORPORATION OF NEW YORK

PROCESS FOR MANUFACTURING OBJECTS FROM NONCONDUCTING MATERIALS

No Drawing. Application filed July 14, 1926, Serial No. 122,511, and in Germany July 18, 1925.

This invention relates to a method of making bodies from non-conducting substances. The new method consists in bringing the original or basic substances into cohesion by means of a high frequency alternating electric field as a result of which there may be simultaneously produced chemical changes between the original substances. The operation involves a fritting action and can be so regulated that no actual fusion of the substances takes place, but these are more or less welded with one another. In consequence, a more or less porous or a dense substance results.

Any suitable substance can be employed as the initial material, either amorphous, crystalline or a mixture of various substances. Thus it is for example, possible to produce porous or dense ceramic bodies, or more or less transparent glass articles. The more finely the original substance is divided the more homogeneous is the texture or structure of the resulting substance as the substances or portions to be combined with one another are brought into intimate contact with one another from the beginning. An intimate contact can also be effected without the original substances being finely divided throughout, if at least one of the said original substances is finely divided. The process can be further facilitated by compressing the basic substances or by shaking or pressing them into a mould, and by moistening with an easily wetting liquid. By a suitable choice of moistening liquid (for example, alcohol), the air may be removed from between the particles. There is nothing to prevent the original substances from being subjected to the action of the high frequency electric field in a mould which may give the final form to the substances to be produced, provided that the mould is not of such character as will unduly weaken the high frequency electric fields.

The fritting action whereby the particles of the substance are caused to cohere, is effected by placing the mass in the field of a high frequency alternating current. This current does not pass through the substance, but only through the conductor arranged in the form of a coil. The field may be within a helical coil or closely adjacent to a flat coil. Within the field there are developed Foucault currents.

It is not definitely known to what extent in the process, Foucault currents or microarcing between the particles causes the fritting action, but one or both are present and active. It has been found advisable to mix the original substance with better conducting substances (for example, salts or liquids) and to heat them prior to the beginning of the process.

As the process can be so regulated that no actual fusion of the basic substances takes place, the substance retains its shape; so that no subsequent finishing of the article is needed after its fritting. Moreover, no flow of the particles of the basic substance takes place. In consequence, definite differences can be obtained between various parts of the bodies to be produced; thus different substances can alternate with one another in layers or a porosity can be produced in certain parts of the article (for example, by incorporating in said parts suitable ingredients) whilst the remainder of the body is generally dense. Also the process is not affected if the basic substances employed in a mixture or in different parts of the article have different specific gravities or different properties. If the process be so regulated that the temperature of the substance remains low, it is further possible to use as the basic or original ingredients wholly or in part, substances which would not remain stable at their own fusing points. Consequently by reason of the great freedom in the choice of ingredients the physical and chemical characteristics of the substance to be produced can be varied within wide limits.

As an example, powdered glass may be fritted to make a solid mass which is more or less dense and more or less transparent depending upon the fineness of the particles, the strength of the current and the time of treatment. Coal dust may be fritted into briquettes without the use of any binders and bricks may be made of sand or clay.

As an example of the current which may be used for fritting glass, the coil may be a flat spiral coil with fourteen windings of iron wire of 4 mm. diameter, the successive turns being spaced 2 mm. apart, whereby the coil is of 168 mm. diameter. Through this coil may be passed a current having a frequency of 545,000 cycles per second and a wave length of 550 m. This current may be developed from the current of a 220 volt 500 cycle generator by the use of suitable transformers, condensers, regulating induction coils, etc., as is well known to those skilled in the development of high frequency current.

Having thus described my invention, what I claim as new and desire to secure by Letters Patent is:

1. The process for the production of bodies from non-conducting substances, which includes the step of placing the substances in a finely subdivided state and under compression in a high frequency electric field, whereby the micro-arcing between the particles effects cohesion of the substances, and without the direct passage through the substances of electric current producing said field.

2. The process for the production of bodies from non-metallic substances in a finely subdivided state, which includes compressing the substance to the desired form, and effecting cohesion of the particles of the substance at comparatively low temperature by the micro-arcing produced between the particles by the action of a high frequency alternating current field.

3. The process of producing rigid solid bodies from finely subdivided particles of non-conducting substances, which includes compressing the particles to form a body of the desired shape, and placing said body in a high frequency alternating current field and out of contact with any current conductor, whereby the micro-arcing between particles occurs and cohesion of the particles is effected at comparatively low temperature.

In testimony whereof I affix my signature.

ALFRED UHLMANN.